United States Patent
Shiratani et al.

(10) Patent No.: US 11,879,589 B2
(45) Date of Patent: Jan. 23, 2024

(54) SHOVEL

(71) Applicant: SUMITOMO(S.H.I.) CONSTRUCTION MACHINERY CO., LTD., Tokyo (JP)

(72) Inventors: Ryuji Shiratani, Chiba (JP); Hiroyuki Kurokawa, Chiba (JP); Hajime Aragaki, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 1128 days.

(21) Appl. No.: 16/582,414

(22) Filed: Sep. 25, 2019

(65) Prior Publication Data

US 2020/0018440 A1 Jan. 16, 2020

Related U.S. Application Data

(63) Continuation of application No. PCT/JP2018/013981, filed on Mar. 30, 2018.

(30) Foreign Application Priority Data

Mar. 30, 2017 (JP) .................. 2017-068500

(51) Int. Cl.
*E02F 9/00* (2006.01)
*F16N 29/02* (2006.01)
(Continued)

(52) U.S. Cl.
CPC .............. *F16N 29/02* (2013.01); *E02F 3/42* (2013.01); *E02F 3/651* (2013.01); *E02F 9/126* (2013.01);
(Continued)

(58) Field of Classification Search
CPC ...... F16N 29/02; F16N 2270/70; F16N 11/00; E02F 3/42; E02F 3/651; E02F 9/126;
(Continued)

(56) References Cited

U.S. PATENT DOCUMENTS 3,527,322 A * 9/1970 Roberts ................... F16N 29/04
184/7.4
4,445,168 A * 4/1984 Petryszyn ............... F16N 29/04
184/6.14

(Continued)

FOREIGN PATENT DOCUMENTS

JP H01-190837 7/1989
JP H04-132299 U 12/1992
(Continued)

OTHER PUBLICATIONS

International Search Report for PCT/JP2018/013981 dated Apr. 24, 2018.

*Primary Examiner* — Edwin J Toledo-Duran
(74) *Attorney, Agent, or Firm* — IPUSA, PLLC

(57) ABSTRACT

A shovel includes a lower traveling body, an upper turning body turnably attached to the lower traveling body, an automatic greasing device mounted on the upper turning body, and a control device configured to control the automatic greasing device. The control device is configured to control timing to start greasing by the automatic greasing device based on the past operating condition of the shovel.

15 Claims, 10 Drawing Sheets

(51) Int. Cl.
*E02F 3/42* (2006.01)
*E02F 3/65* (2006.01)
*E02F 9/20* (2006.01)
*F01M 11/10* (2006.01)
*E02F 9/12* (2006.01)

(52) U.S. Cl.
CPC .......... *E02F 9/2025* (2013.01); *E02F 9/2058* (2013.01); *F01M 11/10* (2013.01); *F16N 2270/70* (2013.01)

(58) Field of Classification Search
CPC ..... E02F 9/2025; E02F 9/2058; E02F 9/0858; E02F 3/32; E02F 9/24; E02F 9/00; F01M 11/10
See application file for complete search history.

(56) References Cited

U.S. PATENT DOCUMENTS

| | | | |
|---|---|---|---|
| 4,520,902 A * | 6/1985 | Snow | F16N 25/02 184/29 |
| 4,674,030 A * | 6/1987 | Gabriel | F16N 29/04 700/79 |
| 5,244,350 A * | 9/1993 | Yang | F04B 49/065 417/63 |
| 5,482,138 A * | 1/1996 | Mori | F16N 29/02 184/6 |
| 5,823,295 A | 10/1998 | Griffith et al. | |
| 5,839,213 A * | 11/1998 | Abbott | E02F 9/0875 184/6.4 |
| 7,168,462 B1 * | 1/2007 | Marine | B60R 17/00 184/14 |
| 8,464,837 B2 * | 6/2013 | Algulin | F16N 29/02 184/7.3 |
| 8,509,999 B2 * | 8/2013 | Suzuki | E02F 9/267 701/50 |
| 8,596,417 B2 * | 12/2013 | Barrett | F16N 29/04 184/6.4 |
| 9,169,970 B2 * | 10/2015 | Gillespie | F16N 7/38 |
| 9,303,814 B2 * | 4/2016 | Ifield | F16N 7/385 |
| 9,604,668 B2 * | 3/2017 | Storey | B60K 31/00 |
| 9,638,370 B2 * | 5/2017 | Günther | F16N 7/385 |
| 9,920,878 B2 * | 3/2018 | Beck | F16N 7/385 |
| 10,422,475 B2 * | 9/2019 | Willems | G01F 15/063 |
| 10,760,736 B2 * | 9/2020 | Gratton | F16N 7/36 |
| 11,105,464 B2 * | 8/2021 | Letscher | F16N 7/385 |
| 11,391,015 B2 * | 7/2022 | Taguchi | E02F 9/0883 |
| 11,692,333 B2 * | 7/2023 | Lee | E02F 9/2004 701/50 |
| 2012/0125442 A1 | 5/2012 | Sutherland et al. | |

FOREIGN PATENT DOCUMENTS

| | | |
|---|---|---|
| JP | H05-042895 U | 6/1993 |
| JP | H06-014252 U | 2/1994 |
| JP | H06-123121 | 5/1994 |
| JP | H09-137466 | 5/1997 |
| JP | H10-237896 | 9/1998 |
| JP | H10-237897 | 9/1998 |
| JP | H11-222878 | 8/1999 |
| JP | 2000-074292 | 3/2000 |
| JP | 2000-213690 | 8/2000 |
| JP | 2002-004335 | 1/2002 |
| JP | 2005-133811 | 5/2005 |
| JP | 2007-074292 | 3/2007 |
| JP | 4533021 | 8/2010 |
| WO | 2009/051550 | 4/2009 |

* cited by examiner

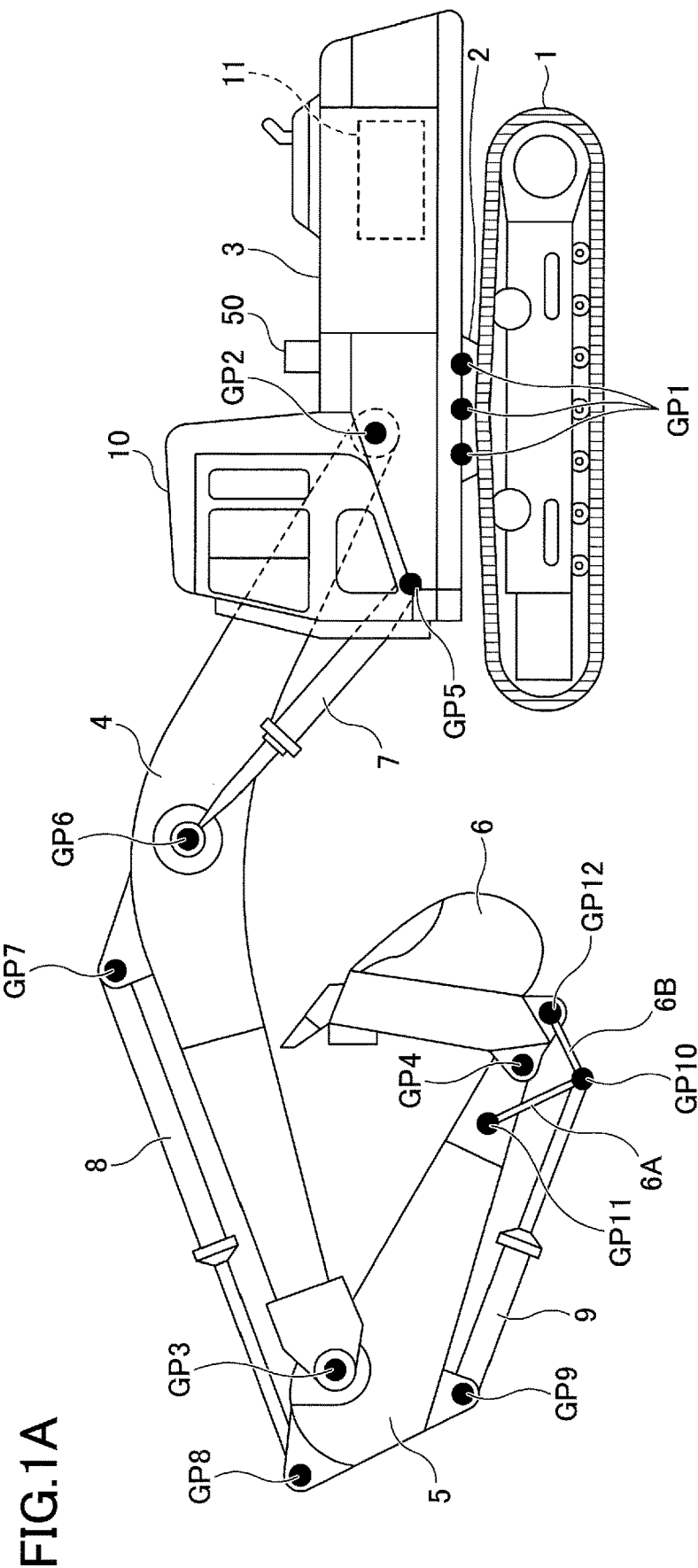
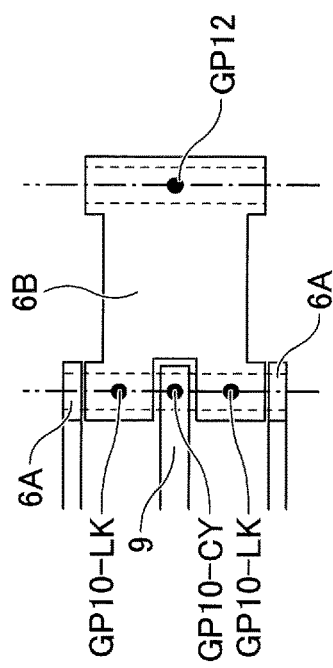
FIG.1A
FIG.1B

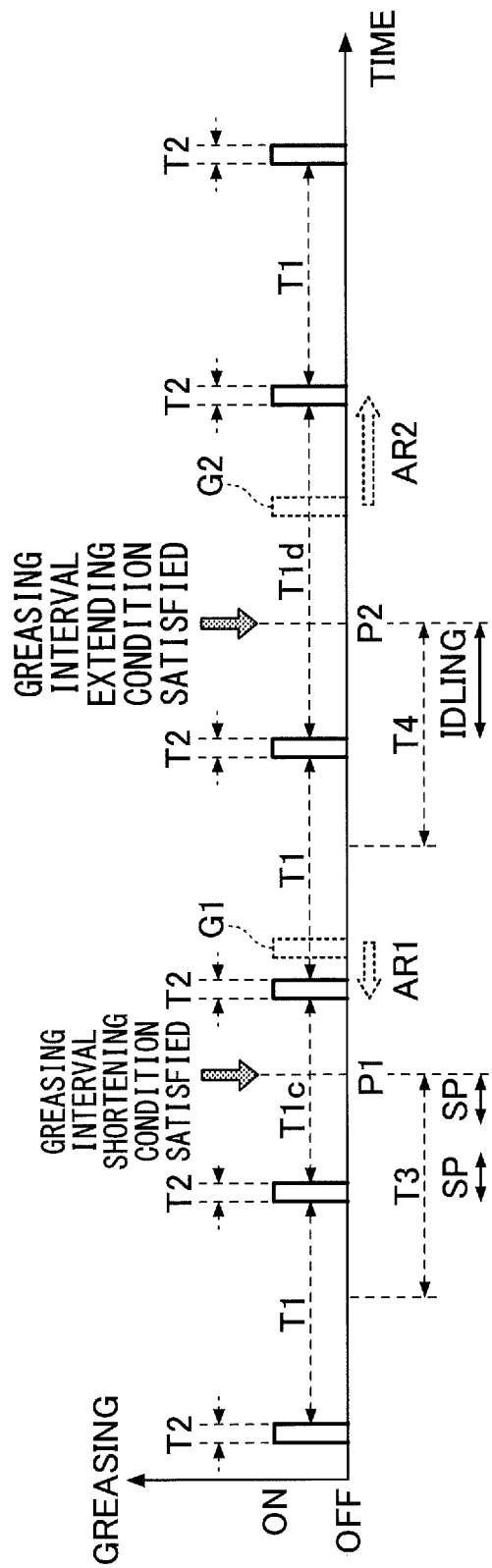

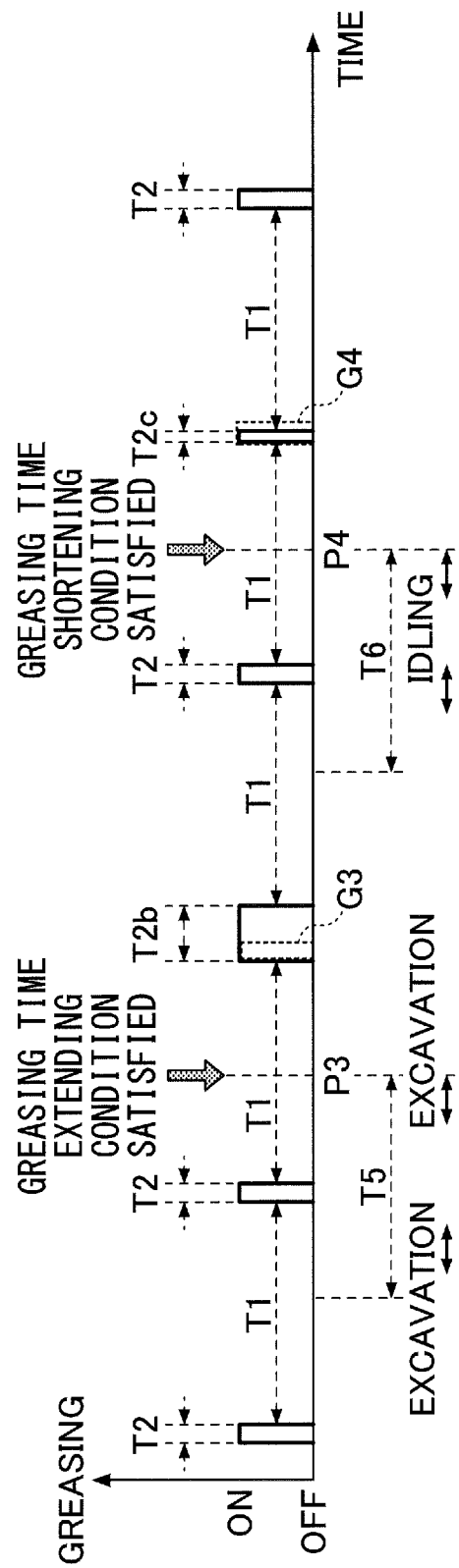

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/013981, filed on Mar. 30, 2018 and designating the U.S., which claims priority to Japanese patent application No. 2017-068500, filed on Mar. 30, 2017. The entire contents of the foregoing applications are incorporated herein by reference.

BACKGROUND

Technical Field

The present invention relates to shovels.

Description of Related Art

A shovel with an automatic greasing device has been known. This automatic greasing device periodically greases pin linking members while the shovel is in operation, specifically, while a work apparatus composed of a boom, an arm, and a bucket is in operation, and greases no pin linking members when the work apparatus is not in operation. That is, by preventing failure to feed grease and preventing feeding more grease than is necessary, waste of grease is eliminated.

SUMMARY

According to an aspect of the present invention, a shovel includes a lower traveling body, an upper turning body turnably attached to the lower traveling body, an automatic greasing device mounted on the upper turning body, and a control device configured to control the automatic greasing device. The control device is configured to control timing to start greasing by the automatic greasing device based on the past operating condition of the shovel.

BRIEF DESCRIPTION OF THE DRAWINGS

FIG. 1A is a side view of a shovel according to an embodiment of the present invention;

FIG. 1B is a diagram illustrating a structure around a rod-side link pin as viewed from below;

FIG. 8A is a chart illustrating yet another example of the temporal transition of the greasing state and the non-greasing state; and FIG. 8B is a chart illustrating still another example of the temporal transition of the greasing state and the non-greasing state.

DETAILED DESCRIPTION

Figure 2:
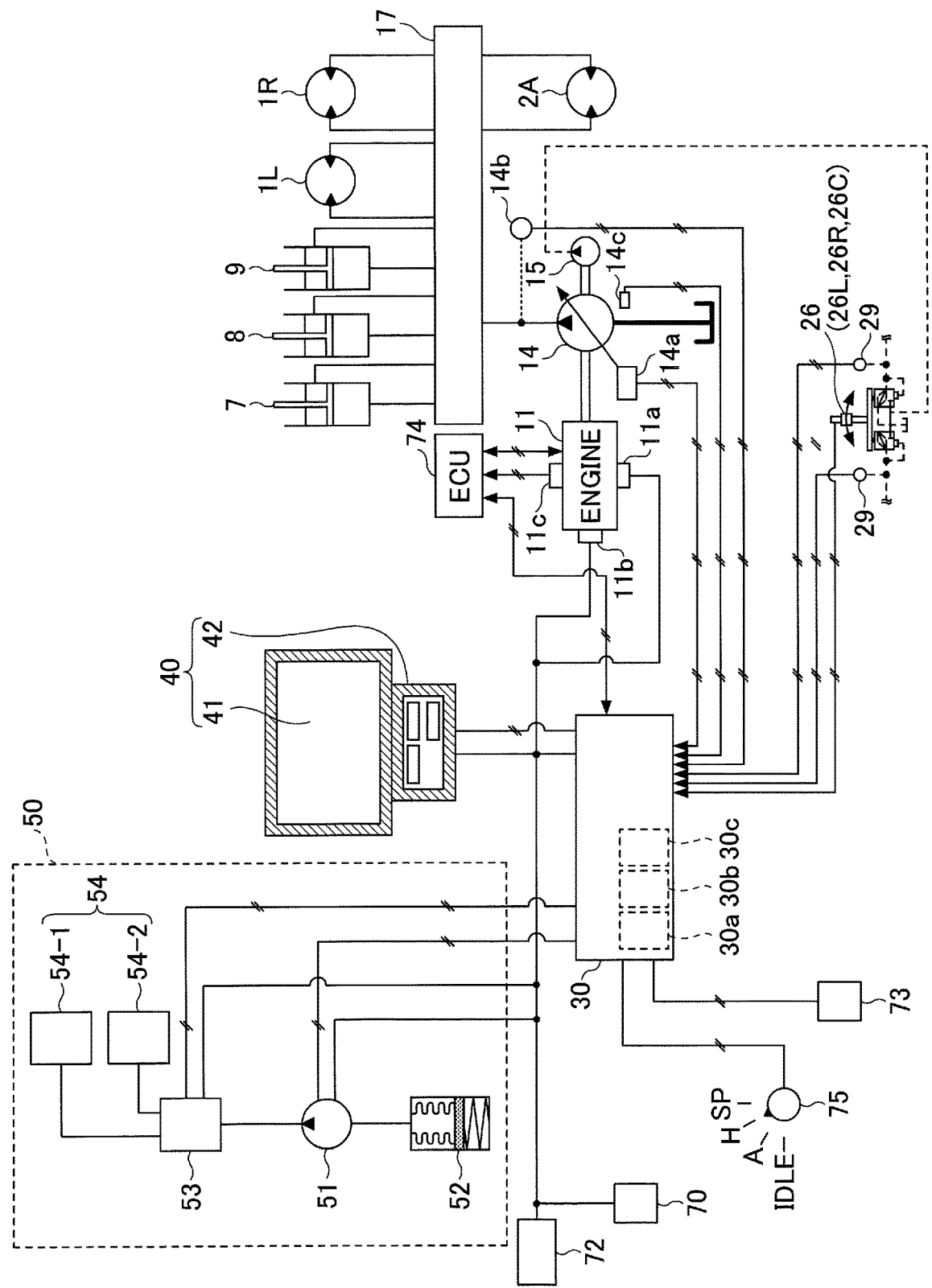
FIG. 2 is a diagram illustrating an example configuration of a basic system installed in the shovel of FIG. 1.

The related-art automatic greasing device, however, does not grease pin linking members before a set period of time passes since the start of the work apparatus even when an engine installed in the shovel is started after being stopped for a long period of time. Therefore, the work apparatus may be put into operation with insufficient or deteriorated grease.

Therefore, it is desirable to provide a shovel that can feed grease with more appropriate timing.

According to an aspect of the present invention, a shovel that can feed grease with more appropriate timing is provided.

FIG. 1A is a side view of a shovel according to an embodiment of the present invention. An upper turning body 3 is turnably mounted on a lower traveling body 1 of the shovel via a turning mechanism 2. A boom 4 is attached to the upper turning body 3. An arm 5 is attached to the end of the boom 4, and a bucket 6 is attached to the end of the arm 5. The boom 4, the arm 5, and the bucket 6 constitute an excavation attachment as an example of an attachment, and are hydraulically driven by a boom cylinder 7, an arm cylinder 8, and a bucket cylinder 9, respectively.

A cabin 10 serving as a cab, an engine 11 serving as a drive source, an automatic greasing device 50, etc., are mounted on the upper turning body 3.

The automatic greasing device 50 automatically feeds a lubricant such as grease to multiple greasing points. According to this embodiment, the greasing points include a ring GP1 of the turning mechanism 2, a boom foot pin GP2, an arm pin GP3, a bucket pin GP4, a bottom-side link pin GP5 and a rod-side link pin GP6 of the boom cylinder 7, a bottom-side link pin GP7 and a rod-side link pin GP8 of the arm cylinder 8, a bottom-side link pin GP9 and a rod-side link pin GP10 of the bucket cylinder 9, an arm-side link pin GP11 of a first bucket link 6A, and a bucket-side link pin GP12 of a second bucket link 6B. Furthermore, according to this embodiment, as illustrated in FIG. 1B, the greasing points for the rod-side link pin GP10 include three points: a right side GP10-LK of the rod-side link pin GP10 in the second bucket link 6B, a left side GP10-LK of the rod-side link pin GP10 in the second bucket link 6B, and a center GP10-CY of the rod-side link pin GP10 of the bucket cylinder 9. FIG. 1B illustrates a structure around the rod-side link pin GP10 as viewed from below.

Next, an example configuration of a basic system installed in the shovel of FIG. 1 is described with reference to FIG. 2. FIG. 2 is a diagram illustrating an example configuration of the basic system. The basic system mainly includes a controller 30, a display device 40, the automatic greasing device 50, etc.

The controller 30 is a control device that controls various devices installed in the shovel. The controller 30 is composed of a processing unit including a CPU, an internal memory, etc. The CPU executes a program stored in the internal memory to implement various functions of the controller 30. The controller 30 includes a time obtaining part 30a, an operating state estimating part 30b, and a greasing controlling part 30c as functional elements.

The time obtaining part 30a is a functional element that obtains an elapsed time between two time points. According to this embodiment, the time obtaining part 30a can process a time exceeding 24 hours. The time obtaining part 30a obtains an elapsed time between a first time point and a second time point based on, for example, a GPS signal (time information including a week number) received via a GPS receiver at each of the first time point and the second time point. In this case, the time obtaining part 30a may derive the number of days elapsed between the first time point and the second time point. The time obtaining part 30a may receive signals from another device with a calendar function, a date managing function, or the like and derive an elapsed time between the first time point and the second time point (that may exceed 24 hours).

The operating state estimating part 30b is a functional element that estimates the operating state of the shovel. According to this embodiment, the operating state estimating part 30b estimates the operating state of the shovel based on the outputs of an information obtaining device 73, an engine rotational speed adjustment dial 75, and the like.

The information obtaining device 73 detects information on the shovel. According to this embodiment, the information obtaining device 73 includes at least one of a boom angle sensor, an arm angle sensor, a bucket angle sensor, a body tilt sensor, a turning angular velocity sensor, a boom rod pressure sensor, a boom bottom pressure sensor, an arm rod pressure sensor, an arm bottom pressure sensor, a bucket rod pressure sensor, a bucket bottom pressure sensor, a boom cylinder stroke sensor, an arm cylinder stroke sensor, a bucket cylinder stroke sensor, a discharge pressure sensor 14b, and an operating pressure sensor 29. For example, the information obtaining device 73 obtains at least one of a boom angle, an arm angle, a bucket angle, a body tilt angle, a turning angular velocity, a boom rod pressure, a boom bottom pressure, an arm rod pressure, an arm bottom pressure, a bucket rod pressure, a bucket bottom pressure, a boom stroke amount, an arm stroke amount, a bucket stroke amount, the discharge pressure of a main pump 14, and the operating pressure of an operating apparatus 26 as shovel-related information.

The engine rotational speed adjustment dial 75 is a dial for adjusting the rotational speed of the engine 11, and can switch the engine rotational speed in a stepwise manner, for example. According to this embodiment, the engine rotational speed adjustment dial 75 is so configured as to be able to switch the engine rotational speed among the four levels of SP mode, H mode, A mode, and idling mode. The engine rotational speed adjustment dial 75 transmits data indicating the setting of the engine rotational speed to the controller 30. FIG. 2 illustrates that the H-mode is selected by the engine rotational speed adjustment dial 75.

The SP mode is an engine mode selected when it is desired to prioritize workload, and uses the highest engine rotational speed. The H mode is an engine mode selected when it is desired to balance workload and fuel efficiency, and uses the second highest engine rotational speed. The A mode is an engine mode selected when it is desired to operate the shovel at low noise while prioritizing fuel efficiency, and uses the third highest engine rotational speed. The idling mode is an engine mode selected when it is desired to idle the engine, and uses the lowest engine rotational speed. The engine 11 is controlled to a constant rotational speed at the engine rotational speed of the rotational speed mode set by the engine rotational speed adjustment dial 75.

The greasing controlling part 30c is a functional element that controls the automatic greasing device 50. According to this embodiment, the greasing controlling part 30c controls timing to start greasing by the automatic greasing device 50, timing to end the greasing, etc., based on the outputs of the time obtaining part 30a, the operating state estimating part 30b, etc. The greasing controlling part 30c may select a greasing point and may change the distribution ratio among the greasing points on an as-needed basis.

The automatic greasing device 50 mainly includes a grease pump 51, a grease tank 52, a solenoid valve 53, a distributor 54, etc.

The grease pump 51 pumps grease from the grease tank 52 to the distributor 54 via the solenoid valve 53. According to this embodiment, the grease pump 51 is an electric plunger pump with a piston and a cylinder. The piston is reciprocated by a cam mechanism driven by an electric motor. The controller 30 controls the electric motor to control the discharge of grease by the grease pump 51. The grease pump 51 may be a pump of another driving system such as a hydraulic system, a pneumatic system, or the like.

The grease tank 52 is a container for containing grease. According to this embodiment, the grease tank 52 is a container that accommodates a grease cartridge urged in a compression direction by a spring. Another container such as a pail may be used.

The solenoid valve 53 operates in response to a control command from the controller 30. According to this embodiment, the solenoid valve 53 is a spool valve with one inlet port and two outlet ports. The inlet port is connected to the discharge port of the grease pump 51. Each of the two outlet ports is connected to the distributor 54.

The distributor 54 is a device that distributes the grease pumped by the grease pump 51 to the greasing points. According to this embodiment, the distributor 54 includes a first distributor 54-1 and a second distributor 54-2.

The controller 30 switches the valve position of the solenoid valve 53 so that grease is pumped to at least one of the first distributor 54-1 and the second distributor 54-2. The solenoid valve 53 has, for example, a first valve position that causes the inlet port to communicate with one of the outlet ports, a second valve position that causes the inlet port to communicate with the other of the outlet ports, a third valve position that disconnects the inlet port from both outlet ports, and a fourth valve position that causes the inlet port to communicate with both outlet ports. The solenoid valve 53 may alternatively have a three-position configuration of the first valve position, the second valve position, and the third valve position.

Figure 3:
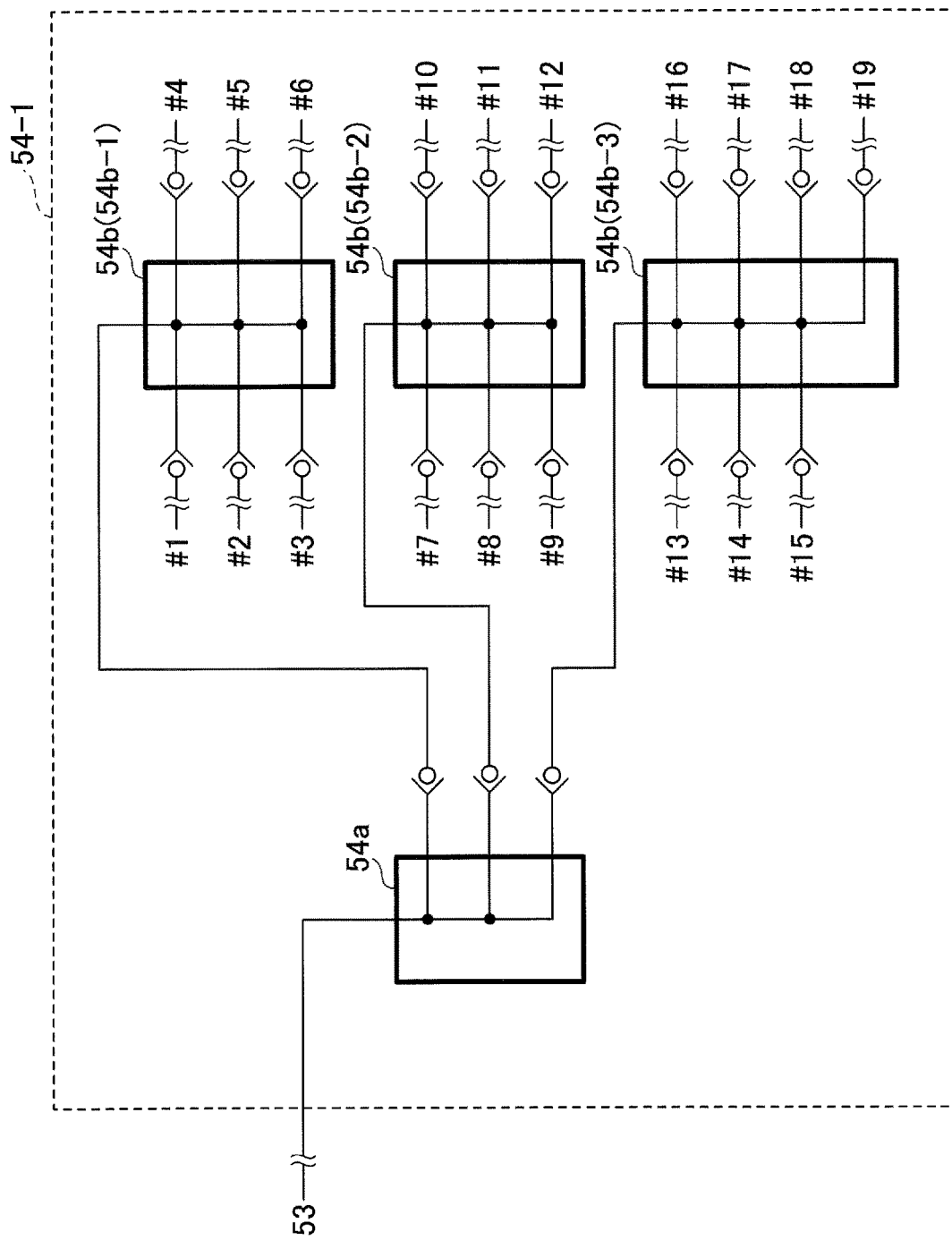
FIG. 3 is a diagram showing an example configuration of a first distributor.

FIG. 3 is a diagram illustrating an example configuration of the first distributor 54-1. As illustrated in FIG. 3, the first distributor 54-1 includes one main distributor 54a and three sub-distributors 54b (54b-1 through 54b-3).

According to the illustration of FIG. 3, the main distributor 54a has one inlet port and three outlet ports. A check valve is attached to each outlet port. The inlet port is connected to an outlet port of the solenoid valve 53. Each of the three outlet ports is connected to the inlet port of the corresponding sub-distributor 54b. The main distributor 54a is configured to discharge the same amount of grease as received at the inlet port from each of the three outlet ports in sequential order.

According to the illustration of FIG. 3, the sub-distributor 54b-1 has one inlet port and six outlet ports. A check valve is attached to each outlet port. The inlet port is connected to an outlet port of the main distributor 54a. Each of the six outlet ports is connected to a discharge port placed at a greasing point. The sub-distributor 54b-1 is configured to discharge the same amount of grease as received at the inlet port from each of the six outlet ports in sequential order. The same applies to the sub-distributor 54*b*-2 and the sub-distributor 54*b*-3. The sub-distributor 54*b*-3, however, has seven outlet ports.

According to this configuration, the first distributor 54-1 in FIG. 3 can feed grease to up to 19 greasing points. In FIG. 3, #1, #2 . . . #19 denote 19 greasing points. At least two of the 19 greasing points may be the same greasing point.

Table 1 illustrates an example of the correspondence relationship between a greasing number and a greasing point. The number of greasing points related to the bucket-side link pin GP12 corresponding to greasing number #1 is one for standard shovels, but is two for crane shovels.

TABLE 1

| Greasing Number | Greasing Point |
| --- | --- |
| #1 | BUCKET-SIDE LINK PIN GP12 OF SECOND BUCKET LINK 6B |
| #2 | ARM-SIDE LINK PIN GP11 OF FIRST BUCKET LINK 6A |
| #3 | RIGHT SIDE GP10-LK OF ROD-SIDE LINK PIN GP10 OF SECOND BUCKET LINK 6B |
| #4 | LEFT SIDE GP10-LK OF ROD-SIDE LINK PIN GP10 OF SECOND BUCKET LINK 6B |
| #5 | BOTTOM-SIDE LINK PIN GP9 OF BUCKET CYLINDER 9 |
| #6 | CENTER GP10-CY OF ROD-SIDE LINK PIN GP10 OF BUCKET CYLINDER 9 |
| #7 | BUCKET PIN GP4 |
| #8 | ARM PIN GP3 |
| #9 | BOTTOM-SIDE LINK PIN GP7 OF ARM CYLINDER 8 |
| #10 | ROD-SIDE LINK PIN GP8 OF ARM CYLINDER 8 |
| #11 | RIGHT SIDE OF BOOM FOOT PIN GP2 |
| #12 | LEFT SIDE OF BOOM FOOT PIN GP2 |
| #13 | RIGHT SIDE OF BOTTOM-SIDE LINK PIN GP5 OF BOOM CYLINDER 7 |
| #14 | LEFT SIDE OF BOTTOM-SIDE LINK PIN GP5 OF BOOM CYLINDER 7 |
| #15 | RIGHT SIDE OF ROD-SIDE LINK PIN GP6 OF BOOM CYLINDER 7 |
| #16 | LEFT SIDE OF ROD-SIDE LINK PIN GP6 OF BOOM CYLINDER 7 |
| #17 | FRONT SIDE OF RING GP1 OF TURNING MECHANISM 2 |
| #18 | REAR SIDE OF RING GP1 OF TURNING MECHANISM 2 |
| #19 | PINION GEAR OF TURNING HYDRAULIC MOTOR 2A |

The display device 40 displays a screen including various kinds of information in response to a command from the controller 30. The display device 40 is, for example, a liquid crystal display connected to the controller 30. The display device 40 is connected to the controller 30 via, for example, a communication network such as a CAN, a dedicated line, or the like. According to this embodiment, the display device 40 includes an image display part 41 and a switch panel 42. The switch panel 42 is a switch panel including various hardware switches.

The controller 30, the display device 40, the automatic greasing device 50, etc., are supplied with electric power from a rechargeable battery 70 to operate. The rechargeable battery 70 is charged by a generator 11*a* driven by the engine 11. The electric power of the rechargeable battery 70 is also supplied to electrical equipment 72, a starter 11*b* of the engine 11, etc. The starter 11*b* is driven with electric power from the rechargeable battery 70 to start the engine 11.

The engine 11 is connected to the main pump 14 and a pilot pump 15 and controlled by an engine control unit (ECU) 74. The ECU 74 transmits various data indicating the condition of the engine 11 to the controller 30. The various data includes, for example, data indicating coolant water temperature detected with a water temperature sensor 11*c*. The controller 30 stores these data in the internal memory and can display the data on the display device 40 at an appropriate time.

The main pump 14 supplies hydraulic oil to a control valve 17 via a hydraulic oil line. According to this embodiment, the main pump 14 is a swash plate variable displacement hydraulic pump, and the discharge flow rate is controlled by a regulator 14*a*. The regulator 14*a* increases or decreases the discharge flow rate of the main pump 14 in response to, for example, a command from the controller 30. The regulator 14*a* transmits data indicating a swash plate tilt angle to the controller 30. The discharge pressure sensor 14*b* transmits data indicating the discharge pressure of the main pump 14 to the controller 30. An oil temperature sensor 14*c* provided in a conduit between the main pump 14 and a tank in which hydraulic oil drawn in by the main pump 14 is stored transmits data representing the temperature of hydraulic oil flowing through the conduit to the controller 30.

The pilot pump 15 supplies hydraulic oil to various hydraulic control apparatus via a pilot line. The pilot pump 15 is, for example, a fixed displacement hydraulic pump.

The control valve 17 is a hydraulic controller that controls a hydraulic system installed in the shovel. The control valve 17 selectively supplies hydraulic oil discharged by the main pump 14 to, for example, a left traveling hydraulic motor 1L, a right traveling hydraulic motor 1R, a turning hydraulic motor 2A, the boom cylinder 7, the arm cylinder 8, the bucket cylinder 9, and the like (hereinafter collectively referred to as "hydraulic actuators").

The operating apparatus 26 is used to operate the hydraulic actuators. According to this embodiment, the operating apparatus 26 includes a left operating lever 26L, a right operating lever 26R, and a travel lever 26C. When the operating apparatus 26 is operated, hydraulic oil is supplied from the pilot pump 15 to a pilot port of a flow control valve for a corresponding hydraulic actuator. Each pilot port is supplied with hydraulic oil of a pressure (pilot pressure) commensurate with the operation details (direction of operation and amount of operation) of a corresponding piece of the operating apparatus 26.

The operating pressure sensor 29 detects a pilot pressure when the operating apparatus 26 is operated, and transmits data indicating the detected pilot pressure to the controller 30. The controller 30 detects the operation details of the operating apparatus 26 from the pilot pressure detected by the operating pressure sensor 29.

Figure 4:
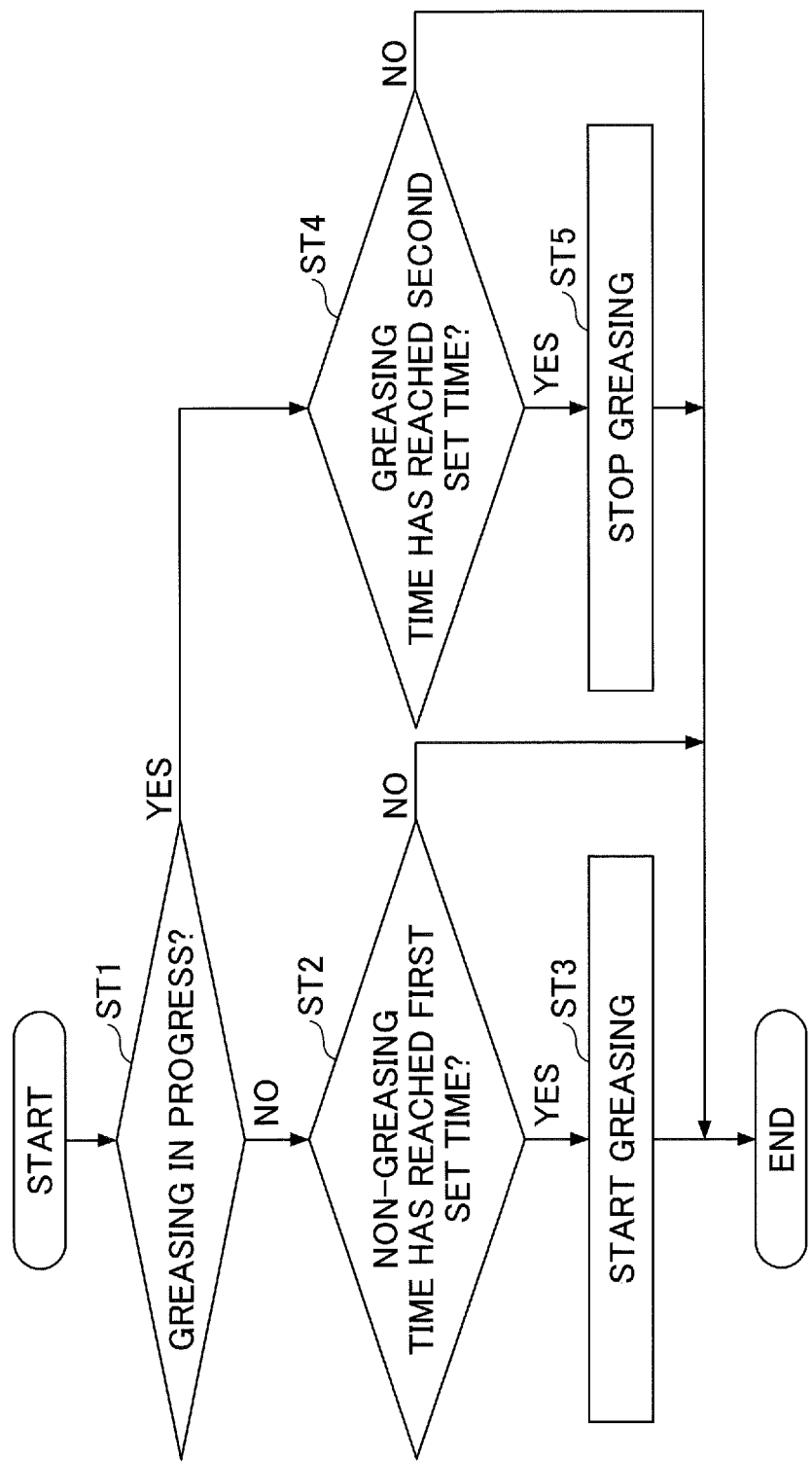
FIG. 4 is a flowchart of a greasing process.

Next, a process of the greasing controlling part 30*c* starting or stopping greasing by the automatic greasing device 50 (hereinafter referred to as "greasing process") is described with reference to FIG. 4. FIG. 4 is a flowchart of the greasing process. For example, the greasing controlling part 30*c* repeatedly executes this greasing process at predetermined control intervals while the controller 30 is being activated.

When the greasing process is started with the activation of the controller 30, first, the greasing controlling part 30*c* determines whether greasing is in progress (step ST1). According to this embodiment, the greasing controlling part 30*c* refers to the value of a greasing flag stored in the internal memory, and determines whether greasing is in progress. For example, the greasing controlling part 30*c* sets the value of the greasing flag to "1" (a value indicating that "greasing is in progress") when outputting a greasing start command to the automatic greasing device 50, and sets the value of the greasing flag to "0" (a value indicating that "greasing is not in progress") when outputting a greasing stop command to the automatic greasing device 50. The greasing controlling part may receive the output signal of the automatic greasing device 50 to determine whether greasing is in progress.

In response to determining that greasing is not in progress (NO at step ST1), the greasing controlling part 30c determines whether a non-greasing time has reached a first set time (step ST2). The "non-greasing time" means the duration of non-greasing state in which no greasing is performed by the automatic greasing device 50. For example, the greasing controlling part 30c starts measuring the non-greasing time when outputting the greasing stop command to the automatic greasing device 50. The first set time is a target time for continuing the non-greasing state, and is, for example, 60 minutes. Hereinafter, the first set time is also referred to as greasing interval.

In response to determining that the non-greasing time has reached the first set time (YES at step ST2), the greasing controlling part 30c starts greasing by the automatic greasing device 50 (step ST3). For example, the greasing controlling part 30c outputs the greasing start command to the automatic greasing device 50. Specifically, the greasing controlling part 30c outputs a drive start command to the grease pump 51, and outputs a valve control command to the solenoid valve 53. The valve control command to the solenoid valve 53 is, for example, a command for achieving a desired valve position. In this case, the greasing start command means a combination of the drive start command and the valve control command.

In response to determining that the non-greasing time has not reached the first set time (NO at step ST2), the greasing controlling part 30c ends the greasing process of this time without starting greasing by the automatic greasing device 50.

In response to determining at step ST1 that greasing is in progress (YES at step ST1), the greasing controlling part 30c determines whether a greasing time has reached a second set time (step ST4). The "greasing time" means the duration of greasing state in which greasing is performed by the automatic greasing device 50. For example, the greasing controlling part 30c starts measuring the greasing time when outputting the greasing start command to the automatic greasing device 50. The second set time is a target time for continuing the greasing state, and is, for example, 5 minutes.

In response to determining that the greasing time has reached the second set time (YES at step ST4), the greasing controlling part 30c stops greasing by the automatic greasing device 50 (step ST5). For example, the greasing controlling part 30c outputs the greasing stop command to the automatic greasing device 50. Specifically, the greasing controlling part 30c outputs a drive stop command to the grease pump 51, and outputs a valve control command to the solenoid valve 53. The valve control command to the solenoid valve 53 is, for example, a command for achieving the third valve position that disconnects the inlet port from both outlet ports. In this case, the greasing stop command means a combination of the drive stop command and the valve control command.

In response to determining that the greasing time has not reached the second set time (NO at step ST4), the greasing controlling part 30c ends the greasing process of this time without stopping greasing by the automatic greasing device 50.

According to the above-described configuration, the greasing controlling part 30c can alternately achieve the non-greasing state that continues for the first set time and the greasing state that continues for the second set time. That is, when the elapsed time since ending greasing reaches a predetermined time, the next greasing is started. This elapsed time basically does not include an elapsed time during which the engine 11 is stopped. The elapsed time, however, may include an elapsed time during which the engine 11 is stopped.

Figure 5:
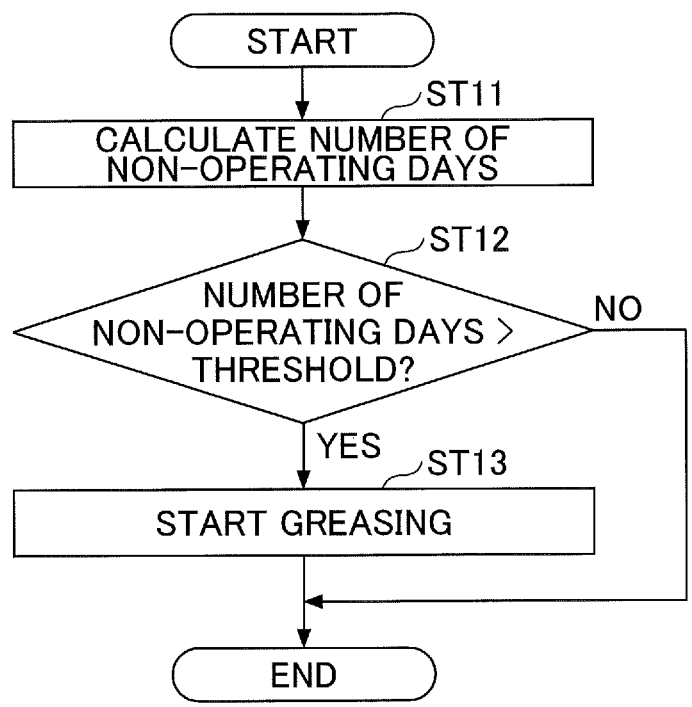
FIG. 5 is a flowchart of an early greasing condition determining process.

Next, a process of the greasing controlling part 30c starting greasing early at the time of starting the engine 11 after a long engine stoppage (hereinafter referred to as "early greasing condition determining process") is described with reference to FIG. 5. FIG. 5 is a flowchart of the early greasing condition determining process. The greasing controlling part 30c executes this early greasing condition determining process at the time of starting the engine 11.

First, the greasing controlling part 30c calculates the number of non-operating days at step ST11. The "number of non-operating days" means the number of days for which the engine continues to be stopped. For example, the greasing controlling part 30c calculates the number of non-operating days based on the date and time at which the engine stops and a current date and time obtained by the time obtaining part 30a. The number of non-operating days may include the latest non-greasing time.

Thereafter, the greasing controlling part 30c determines whether the number of non-operating days exceeds a threshold (number of days) (step ST12). The threshold (number of days) means the number of non-operating days that leads to a state in which early greasing is desired, and is, for example, 14 days.

In response to determining that the number of non-operating days exceeds the threshold (YES at step ST12), the greasing controlling part 30c starts greasing (step ST13) instead of the normal greasing process (see FIG. 4). For example, even before the non-greasing time in the normal greasing process reaches the first set time, the greasing controlling part 30c immediately outputs a greasing start command to the automatic greasing device 50, and immediately starts greasing by the automatic greasing device 50. This is because the grease supplied to the greasing points during the previous greasing is presumed deteriorated or insufficient in amount. Furthermore, this is because the non-greasing time is not measured during engine stoppage. In this case, the greasing controlling part 30c may change at least one of the first set time and the second set time in the normal greasing process. For example, for the subsequent one or more times of greasing, the second set time may be extended so that more grease is fed to the greasing points. Alternatively, for the subsequent one or more times of greasing, the first set time may be shortened so that grease is fed to the greasing points at shorter greasing intervals.

In response to determining that the number of non-operating days does not exceed the threshold (NO at step ST12), the greasing controlling part 30c ends the early greasing condition determining process without immediately starting greasing.

According to the above-described configuration, the greasing controlling part 30c can immediately start greasing at the time of starting the engine 11 after a long engine stoppage. Therefore, it is possible to prevent the excavation attachment from being moved with insufficient or deteriorated grease or with a high proportion of foreign matter in grease. That is, it is possible to prevent occurrence of a lubrication defect.

Figure 6A:
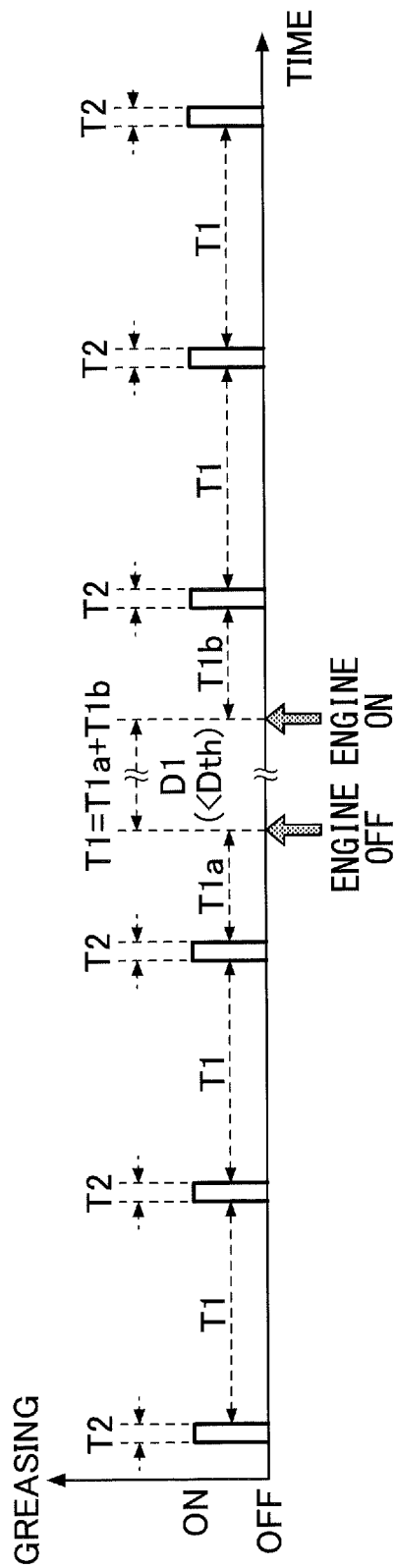
FIG. 6A is a chart illustrating an example of a temporal transition of a greasing state and a non-greasing state.
Figure 6B:
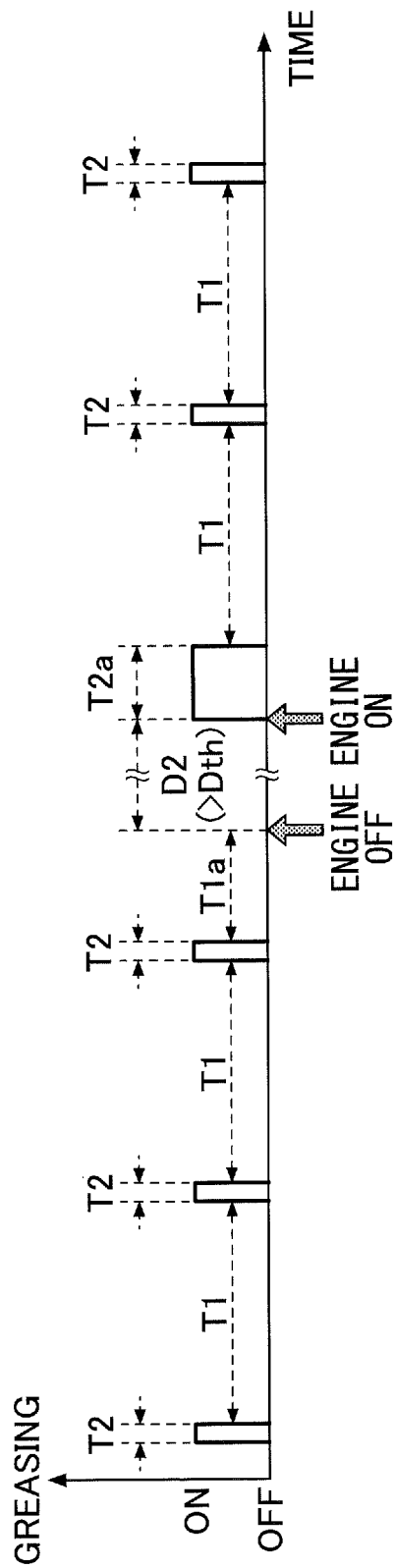
FIG. 6B is a chart illustrating another example of the temporal transition of the greasing state and the non-greasing state.

Next, a change in greasing timing due to the early greasing condition determining process is described with reference to FIGS. 6A and 6B. FIGS. 6A and 6B are charts illustrating temporal transitions of the greasing state and the non-greasing state. In the vertical axis, "ON" indicates the greasing state and "OFF" indicates the non-greasing state. The horizontal axis represents the passage of time. FIGS. 6A and 6B basically illustrate the alternation of the non-greasing state continuing for the first set time T1 and the greasing state continuing for the second set time T2. FIG. 6A shows that greasing is performed after passage of the first set time T1 when the engine 11 is started after the engine stoppage continues for the number of days D1 that is less than a threshold Dth. In contrast, FIG. 6B shows that greasing is immediately performed when the engine 11 is started after the engine stoppage continues for the number of days D2 that is more than the threshold Dth.

Specifically, FIG. 6A shows that the engine 11 is stopped when the non-greasing time reaches a time T1$a$ and the engine 11 is restarted after the engine stoppage continues for the number of days D1 less than the threshold Dth. The non-greasing time is not measured while the engine stoppage continues. Therefore, as illustrated in FIG. 6A, the greasing controlling part 30$c$ restarts measuring the non-greasing time when the engine 11 is restarted, and starts greasing by the automatic greasing device 50 when the non-greasing time further continues for a time T1$b$, that is, when the non-greasing time reaches the first set time T1 (=T1$a$+T1$b$).

In this manner, when the number of non-operating days is less than the threshold Dth, the greasing controlling part 30$c$ can start greasing when the sum of the duration T1$a$ of the non-greasing state immediately before the engine stop and the duration T1$b$ of the non-greasing state immediately after the engine restart reaches the first set time T1.

In contrast, FIG. 6B shows that the engine 11 is stopped when the non-greasing time reaches the time T1$a$ and the engine 11 is restarted after the engine stoppage continues for the number of days D2 that is more than the threshold Dth. In this case, as illustrated in FIG. 6B, the greasing controlling part 30$c$ executes the early greasing condition determining process when the engine 11 is restarted. Therefore, although the non-greasing time has not reached the first set time T1, the greasing controlling part 30$c$ immediately starts greasing by the automatic greasing device 50.

In this manner, when the number of non-operating days is more than the threshold Dth, the greasing controlling part 30$c$ can immediately start greasing when the engine is restarted, regardless of the duration T1$a$ of the non-greasing state immediately before the engine stop. Therefore, it is possible to prevent the excavation attachment from being moved with insufficient or deteriorated grease.

In this case, the greasing controlling part 30$c$ may extend the second set time T2 to a time T2$a$ only for the first greasing after the engine restart as illustrated in FIG. 6B. This is for further ensuring that grease is neither insufficient nor deteriorated.

Figure 7:
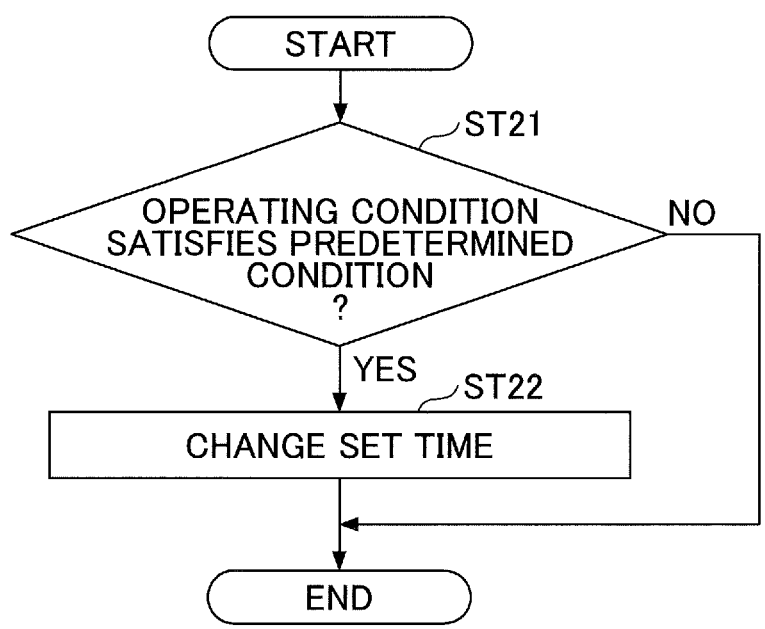
FIG. 7 is a flowchart of a setting change condition determining process.

Next, a process of the greasing controlling part 30$c$ changing a set time with respect to greasing (hereinafter referred to as "setting change condition determining process") is described with reference to FIG. 7. FIG. 7 is a flowchart of the setting change condition determining process. The greasing controlling part 30$c$ repeatedly executes this setting change condition determining process at predetermined control intervals while the controller 30 is being activated.

First, the greasing controlling part 30$c$ determines whether the operating condition of the shovel satisfies a predetermined condition (step ST21). For example, the greasing controlling part 30$c$ determines that the predetermined condition is satisfied when a cumulative idling time during a predetermined period (for example, 60 minutes) in the past exceeds a threshold (for example, 30 minutes). The cumulative idling time is, for example, a total time for which the idling mode is selected. In addition, the greasing controlling part 30$c$ may determine that the predetermined condition is satisfied when a cumulative SP mode time during a predetermined period (for example, 60 minutes) in the past exceeds a threshold (for example, 30 minutes). The cumulative SP mode time is, for example, a total time for which the SP mode is selected. The greasing controlling part 30$c$ derives the cumulative idling time and the cumulative SP mode time based on, for example, the output of the engine rotational speed adjustment dial 75.

The greasing controlling part 30$c$ may determine that the predetermined condition is satisfied when the duration of work (for example, an excavation time) during a predetermined period (for example, 60 minutes) in the past exceeds a threshold (for example, 30 minutes). The excavation time is, for example, the total operating time of the boom 4, the arm 5, or the bucket 6. The greasing controlling part 30$c$ determines whether the boom 4, the arm 5, or the bucket 6 has been operated based on, for example, the output of the operating pressure sensor 29. The greasing controlling part 30$c$ may derive the excavation time based on the output of another information obtaining device 73. In addition, the greasing controlling part 30$c$ may determine whether the predetermined condition is satisfied using an operating time, an idling time or the like that can be calculated in the same manner instead of the duration of work.

Furthermore, the greasing controlling part 30$c$ may determine that the predetermined condition is satisfied when a load (for example, an excavation load) during a predetermined period (for example, half a day) in the past exceeds a threshold. The excavation load is, for example, the integrated value of the pressure values of hydraulic oil in hydraulic cylinders for driving the boom 4, the arm 5, the bucket 6, etc. In addition, the greasing controlling part 30$c$ may derive the excavation load based on the output of another information obtaining device 73.

In response to determining that the operating condition of the shovel does not satisfy the predetermined condition (NO at step ST21), the greasing controlling part 30$c$ ends the setting change condition determining process of this time without changing a greasing condition, that is, without changing a set time.

In response to determining that the operating condition of the shovel satisfies the predetermined condition (YES at step ST21), the greasing controlling part 30$c$ changes a set time (step ST22). For example, the greasing controlling part 30$c$ extends the first set time from 60 minutes to 90 minutes when the cumulative idling time during a predetermined period in the past exceeds a threshold. This is because it can be determined that the timing of feeding grease may be delayed because the excavation attachment has barely moved to cause no reduction in or deterioration of grease. In this case, the greasing controlling part 30$c$ may shorten the second set time. This is for reducing the feed of grease.

For example, when the cumulative SP mode time during a predetermined period in the past exceeds a threshold, or when the excavation time during a predetermined period (for example, 60 minutes) in the past exceeds a threshold (for example, 30 minutes), the greasing controlling part 30$c$ may shorten the first set time from 60 minutes to 50 minutes. This is because it can be determined that the timing of feeding grease may be advanced because the excavation attachment has frequently moved to reduce or deteriorate grease. In this case, the greasing controlling part 30$c$ may extend the second set time. This is for increasing the feed of grease.

Thus, the greasing controlling part 30$c$ can perform greasing with more appropriate timing by changing a greasing condition according to the latest operating condition of the shovel, that is, by changing at least one of the first set time and the second set time. In addition, the greasing controlling part 30c can feed a more appropriate amount of grease.

The operating condition of the shovel may also be the number of non-operating days, a cumulative time during which an engine mode other than the SP mode is selected, the condition of a greasing point (sliding portion), the frequency of operations, or the like. The frequency of operations includes, for example, the number of times of arm closing, the number of times of boom raising, the number of times of turning, etc.

Next, a change in greasing timing due to the setting change condition determining process is described with reference to FIGS. 8A and 8B. FIGS. 8A and 8B are charts illustrating temporal transitions of the greasing state and the non-greasing state. In the vertical axis, "ON" indicates the greasing state and "OFF" indicates the non-greasing state. The horizontal axis represents the passage of time. FIGS. 8A and 8B basically illustrate the alternation of the non-greasing state continuing for the first set time T1 and the greasing state continuing for the second set time T2. FIG. 8A shows that the first set time T1 is shortened to a time T1c when a greasing interval shortening condition is satisfied and the first set time T1 is extended to a time T1d when a greasing interval extending condition is satisfied. FIG. 8B shows that the second set time T2 is extended to a time T2b when a greasing time extending condition is satisfied and the second set time T2 is shortened to a time T2c when a greasing time shortening condition is satisfied.

Specifically, FIG. 8A shows that the greasing interval shortening condition is satisfied at time P1. The greasing controlling part 30c determines that the greasing interval shortening condition is satisfied when the cumulative SP mode time during the latest predetermined period T3 (60 minutes) exceeds a threshold (30 minutes). In this case, the greasing controlling part 30c shortens the first set time T1 (60 minutes) to the time T1c (50 minutes) as illustrated in FIG. 8A. The greasing controlling part 30c starts greasing by the automatic greasing device 50 when the non-greasing time reaches the new first set time T1c. A dotted rectangle G1 in the drawing indicates a greasing time in the case where the first set time T1 is not shortened, and a dotted arrow AR1 indicates that the greasing time is advanced.

Furthermore, FIG. 8A shows that the greasing interval extending condition is satisfied at time P2. The greasing controlling part 30c determines that the greasing interval extending condition is satisfied when the cumulative idling time during the latest predetermined period T4 (60 minutes) exceeds a threshold (30 minutes). In this case, the greasing controlling part 30c extends the first set time T1 (60 minutes) to the time T1d (90 minutes) as illustrated in FIG. 8A. The greasing controlling part 30c starts greasing by the automatic greasing device 50 when the non-greasing time reaches the new first set time T1d. A dotted rectangle G2 in the drawing indicates a greasing time when the first set time T1 is not extended, and a dotted arrow AR2 indicates that the greasing time is delayed.

Thus, the greasing controlling part 30c can shorten the greasing interval by shortening the first set time T1 when the SP mode is frequently used, for example. Therefore, it is possible to prevent the excavation attachment from being moved with insufficient or deteriorated grease. Furthermore, the greasing controlling part 30c can extend the greasing interval by extending the first set time T1 when the idling mode is frequently used, for example. Therefore, it is possible to prevent excessive greasing, or it is possible to prevent grease leakage from a greasing point.

FIG. 8B shows that the greasing time extending condition is satisfied at time P3. The greasing controlling part 30c determines that the greasing time extending condition is satisfied when the excavation time during the latest predetermined period T5 (60 minutes) exceeds a threshold (30 minutes). In this case, the greasing controlling part 30c extends the second set time T2 (5 minutes) to the time T2b (15 minutes) as illustrated in FIG. 8B. Then, the greasing controlling part 30c stops greasing by the automatic greasing device 50 when the greasing time reaches the new second set time T2b. A dotted rectangle G3 in the drawing indicates a greasing time in the case where the second set time T2 is not extended.

Furthermore, FIG. 8B shows that the greasing time shortening condition is satisfied at time P4. The greasing controlling part 30c determines that the greasing time shortening condition is satisfied when the cumulative idling time during the latest predetermined time T6 (60 minutes) exceeds a threshold (30 minutes). In this case, the greasing controlling part 30c shortens the second set time T2 (5 minutes) to the time T2c (3 minutes) as illustrated in FIG. 8B. Then, the greasing controlling part 30c stops greasing by the automatic greasing device 50 when the greasing time reaches the new second set time T2c. A dotted rectangle G4 in the drawing indicates the greasing time in the case where the second set time T2 is not shortened.

Thus, the greasing controlling part 30c can increase the feed of grease by extending the second set time T2 when excavation is frequently performed, for example. Therefore, it is possible to prevent the excavation attachment from being moved with insufficient or deteriorated grease. Furthermore, the greasing controlling part 30c can reduce the feed of grease by shortening the second set time T2 when the idling mode is frequently used, for example. Therefore, it is possible to prevent excessive greasing.

A preferred embodiment of the present invention is described above. The present invention, however, is not limited to the above-described embodiment. Various modifications, substitutions, etc., may apply to the above-described embodiment without departing from the scope of the present invention. Furthermore, the technical features described with reference to the above-described embodiment may be suitably combined as long as causing no technical contradiction.

For example, the greasing controlling part 30c may be configured separately as a device independent of the controller 30.

Furthermore, instead of the cumulative SP mode time, a cumulative H mode time that is a total time for which the H mode is selected, a cumulative A mode time that is a total time for which the A mode is selected, or the like may be used.

What is claimed is:

1. A shovel comprising:
a lower traveling body;
an upper turning body turnably attached to the lower traveling body;
an automatic greasing device mounted on the upper turning body; and
a hardware processor configured to control the automatic greasing device,
wherein the hardware processor is configured to change a set time with respect to greasing by the automatic greasing device based on a past operating condition of the shovel, the past operating condition of the shovel including at least one selected from the group consisting of a number of non-operating days, a cumulative idling time, an excavation time, a cumulative time for which a predetermined drive source mode is selected, and an actuator load, and
wherein the set time is a target time for continuing a non-greasing state or a target time for continuing a greasing state.

2. The shovel as claimed in claim 1, wherein the hardware processor is configured to control timing to end the greasing by the automatic greasing device based on the past operating condition of the shovel.

3. The shovel as claimed in claim 1, wherein
the hardware processor is configured to start next greasing when an elapsed time since ending the greasing reaches a predetermined time, and
the elapsed time includes an elapsed time during which a drive source of the shovel is stopped.

4. The shovel as claimed in claim 1, wherein the hardware processor is configured to change a greasing interval according to the past operating condition of the shovel.

5. The shovel as claimed in claim 1, wherein the hardware processor is configured to start the greasing when a non-greasing time reaches a first set time and end the greasing when a greasing time reaches a second set time, and to start the greasing at a time of starting a drive source even before the non-greasing time reaches the first set time if the number of non-operating days exceeds a threshold.

6. The shovel as claimed in claim 5, wherein the hardware processor is configured to extend the second set time for one or more times of greasing immediately after starting the greasing at the time of starting the drive source.

7. The shovel as claimed in claim 5, wherein the hardware processor is configured to shorten the first set time for one or more times of greasing immediately after starting the greasing at the time of starting the drive source.

8. The shovel as claimed in claim 5, wherein the non-greasing time is not measured while the drive source continues to be stopped.

9. The shovel as claimed in claim 5, wherein the hardware processor is configured to start the greasing by the automatic greasing device when a sum of a duration of the non-greasing state immediately before the drive source is stopped and a duration of the non-greasing state immediately after the drive source is restarted reaches the first set time, if the number of non-operating days is less than a threshold.

10. The shovel as claimed in claim 5, wherein the hardware processor is configured to extend the first set time when the cumulative idling time during a past predetermined period exceeds a threshold.

11. The shovel as claimed in claim 5, wherein the hardware processor is configured to shorten the second set time when the cumulative idling time during a past predetermined period exceeds a threshold.

12. The shovel as claimed in claim 5, wherein the hardware processor is configured to shorten the first set time when the cumulative time for which the predetermined drive source mode is selected or the excavation time during a past predetermined period exceeds a threshold.

13. The shovel as claimed in claim 5, wherein the hardware processor is configured to extend the second set time when the cumulative time for which the predetermined drive source mode is selected or the excavation time during a past predetermined period exceeds a threshold.

14. The shovel as claimed in claim 5, wherein the hardware processor is configured to perform at least one of shortening of the first set time and extension of the second set time when a load during a past predetermined period exceeds a threshold.

15. The shovel as claimed in claim 1, wherein the non-greasing state is a state in which the greasing is not performed by the automatic greasing device and the greasing state is a state in which the greasing is performed by the automatic greasing device.

* * * * *